UNITED STATES PATENT OFFICE.

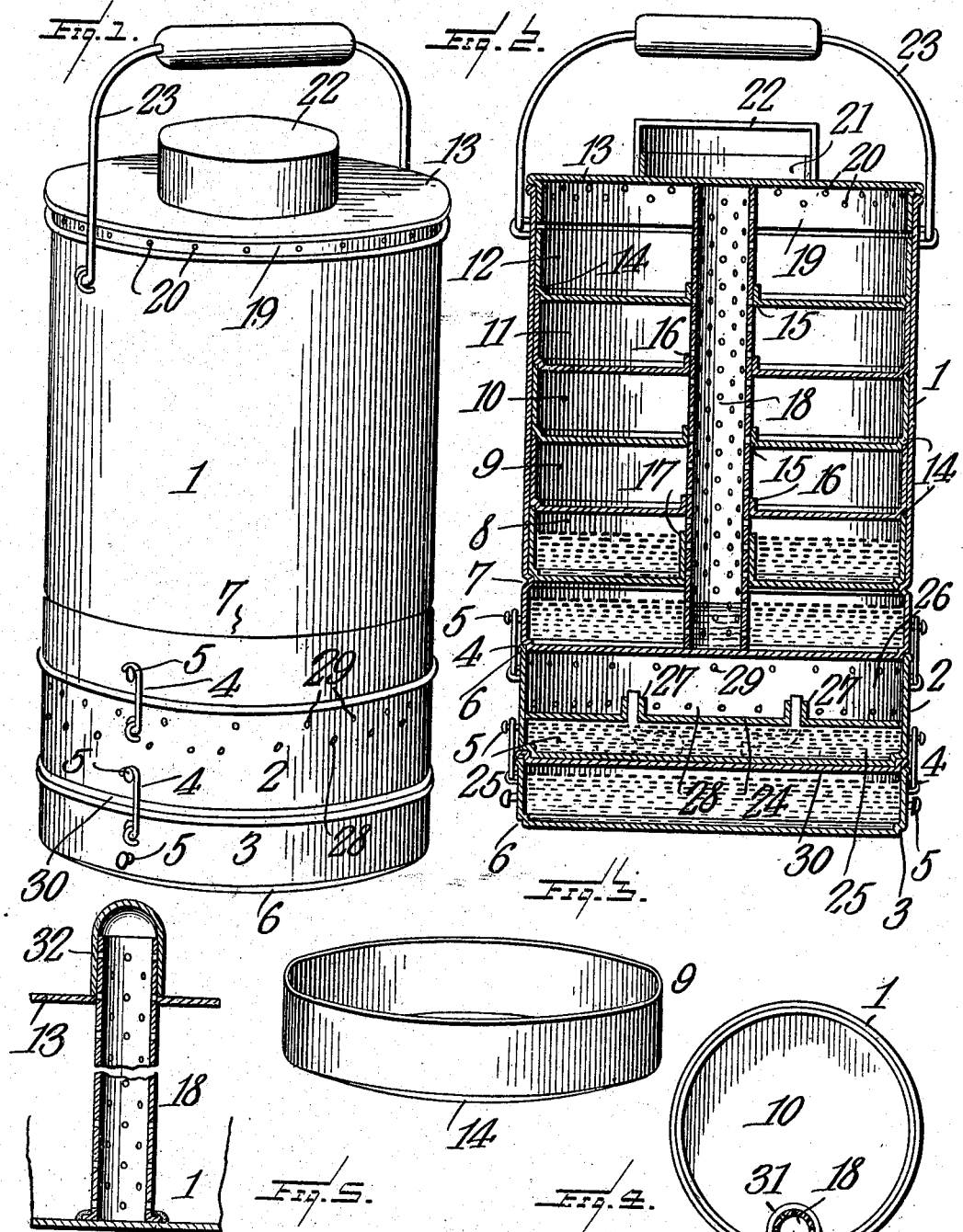

HENRY BUSH WALTRIP, OF CLEATON, KENTUCKY.

DINNER-PAIL.

No. 899,360.      Specification of Letters Patent.      Patented Sept. 22, 1908.

Application filed March 8, 1907. Serial No. 361,379.

*To all whom it may concern:*

Be it known that I, HENRY BUSH WALTRIP, a citizen of the United States, residing at Cleaton, in the county of Muhlenberg and State of Kentucky, have invented a new and useful Dinner-Pail, of which the following is a specification.

This invention relates to a dinner pail of the class used by mechanics, laborers and other workmen to transport from their homes to their places of work, food and drink for their midday meals.

The main object of the invention is to provide a pail capable of keeping several varieties of food wholly separated from each other by placing such food in different receptacles nested in an upper outside bucket, to which is detachably secured a lamp or other heating device for heating water in the bottom of the pail sufficiently hot to generate steam, which latter permeates all the receptacles and warms the food contained in them.

A second object of the invention is to provide a separate but attachable vessel for holding drinking water, coffee, tea or other beverage and providing the same with a closure of unique form to protect the contents of the vessel from contamination; and also to provide a cup carried on top of the pail from which to drink.

A further object of the invention is to provide a simple, and efficacious means for permitting any excessive amount of heat or steam generated in the pail to escape therefrom through the cover.

Other objects of the invention not herein specifically recited will be described in detail hereinafter and pointed out in the claims.

In the drawings: Figure 1 is a perspective view of a dinner pail complete. Fig. 2 is a vertical sectional view through the center. Fig. 3 is a perspective view of one of the food containing receptacles. Fig. 4 is a horizontal sectional view on smaller scale of a modified form of the invention. Fig. 5 is a detail view illustrating a further modification.

Similar numerals indicate corresponding parts in all the figures.

The complete dinner pail as represented in Figs. 1 and 2 comprises three separable sections, the pail or bucket proper 1, the lamp 2 and the water holder 3. The sections 2 and 3 are each provided near their upper edges with two or more pivoted hooks 4, equally spaced around the circumference of the section, while near the bottom of each section 1, 2 and 3 are an equal number of studs or loops 5 similarly disposed to receive the hooks 4 when the sections are to be connected together in the manner shown in Figs. 1 and 2. The bottom of each section is shouldered at 6 to enable the sections to fit one within the other and form a firm tight joint.

The pail proper 1 is formed with an inwardly projecting bead 7 a short distance above its bottom to support a series of nested food receptacles 8, 9, 10, 11 and 12 which substantially fill the pail from the bead 7 to the cover 13. These receptacles are in the form of shallow cylindrical trays made to fit easily within the pail 1, and shouldered on their lower edges as at 14, so that each receptacle will fit within the mouth of the one below it. The lowest receptacle 8 rests on the inwardly projecting bead 7. Each receptacle is provided with a central opening 15, preferably flanged, to prevent liquid or semi-liquid food from passing therethrough. The flanges surrounding the holes 15 may be shallow as at 16, or extend up nearly to the top of the receptacle as indicated at 17 on tray 8, in the latter case, liquid foods can be safely carried in the pail.

Extending loosely through the openings 15 in the receptacles from the bottom of pail 1 to the top 13 is a perforated pipe 18. The pipe is preferably not fastened to the pail but depends on the food receptacles for support. It can therefore be easily removed and the trays withdrawn from the bucket by placing the finger in the hole 15. The bucket top or cover 13 has a depending flange 19 fitting within the bucket 1, and a series of perforations 20 near the top. A ring 21 is soldered or otherwise secured to the bucket cover 13 to carry a drinking cup 22 as usual. When the cover is tightly closed it rests upon and closes the top of the perforated pipe 18. The dinner pail is carried in the usual manner by a handle 23 of ordinary construction.

The lamp section 2 is divided by a horizontal partition 24 into two parts, the oil pot 25 and the combustion chamber 26. Two wick tubes 27 project upwardly from the partition 24 into the combustion chamber and connect with the oil pot 25. A series of openings 28 is formed through the wall of the combustion chamber 26 just above the partition 24 and a second series of apertures 29 at the top.

The lowest section 3 is provided for carrying drinking water, tea, coffee, or other beverage. Its mouth is closed by a cover plate 30 depressed or countersunk for the shouldered bottom 6 of the lamp section 2. The cover plate 30 is to prevent oil and other matters from contaminating the contents of the vessel.

The dinner pail, constructed as above described, will first have a small quantity of water placed therein, not enough to reach the bead 7. The receptacle 8 may then be put in place containing coffee, tea, soup or other liquid food, the flange 17 enabling the receptacle to be filled. The other receptacles as they are filled are placed in the pail, one upon the other until all have been put in place. The perforated tube 18 is then inserted through the openings 15, the cover 13 put in place and the lamp section 2 and water section 3 properly secured and the pail is ready. If the dinner is to be heated, the lamp wick is lighted and the flame heats the water in the bottom of the bucket 1, which generates a light vapor or steam which rising through the tube 18, passes out through the perforations into all parts of the pail, quickly heating the contents. Should too much steam be generated, the cover 13 is raised high enough to uncover the perforations 20, permitting steam to quickly escape from the pail, thus keeping down the temperature of the contents.

Instead of passing the perforated tube 18 through the center of the receptacles, it may be placed on one side as in Fig. 4, and the outer flanges of the receptacles curved as illustrated at 31 in said figure, to pass around said tube.

A further modification consists in fasting the perforated tube to the bottom of the pail and let it pass through an opening in the top as in Fig. 5, a thimble or cap 32 being used for closing the upper end of the tube when heating the bucket and to be removed when the pail gets too warm.

Having thus described the invention what is claimed is:—

1. A dinner pail comprising a pail proper having an inwardly projecting horizontal bead near the bottom, a plurality of trays superposed one upon another the whole number upheld by said bead, each of said trays having an opening surrounded by an upturned flange, a removable perforated tube extending from the bottom to the top of the pail through said flanged openings, a cover for said pail having a perforated flange to permit the escape of steam when the cover is partly raised, and a lamp section attached to the under side of the pail.

2. A dinner pail comprising a pail proper having an inwardly projecting horizontal bead near the bottom below which bead water is to be placed, a plurality of trays superposed one upon another the whole number of trays upheld by said bead above the water section of the pail, each of said trays having a central opening surrounded by an upturned flange, the lower tray or trays for holding liquids having a higher flange, a removable perforated tube extending from the bottom to the top of said pail to permit steam from the water and liquids to pass into the trays containing solid food and heat them by direct contact and indirectly by heating the bottoms of the trays, and a lamp section removably connected to the bottom of the pail.

3. A dinner pail comprising a pail proper having an inwardly projecting horizontal bead near the bottom below which bead water is to be placed, a plurality of interchangeable food receptacles adapted to be nested and supported wholly upon said bead each receptacle having a central opening surrounded by an upturned flange, a perforated tube extending through said flanged openings from the bottom to the top of the pail, a closure for said pail having a downwardly extending flange to enter the top of the pail perforations being formed in said flange for the escape of steam and hot air when the closure is slightly raised, a lamp section having means for removably attaching it to the bottom of the pail for heating the water therein the steam and vapor from which rises in said perforated tube and passes into each receptacle through the perforations, and a section for carrying cold liquids having a removable cover, and means for temporarily connecting it to the lamp section.

4. A dinner pail comprising a plurality of separable sections in axial alinement, means for connecting said sections one to another, a plurality of food receptacles in the uppermost section nested and supported on a horizontal bead, a perforated tube extending from the bottom to the top of said sections through flanged perforations in said receptacles and a flanged removable closure for said sections having perforations through said flange.

In testimony that I claim the foregoing as my own, I have hereto affixed my signature in the presence of two witnesses.

HENRY BUSH WALTRIP.

Witnesses:
PINKNEY YOUNG,
RAYMOND STROTHER.